H. HILL.
DUST COLLECTOR.
APPLICATION FILED MAY 25, 1909.

959,936.

Patented May 31, 1910.

WITNESSES:
F. C. Gibson.
Fred Baker

INVENTOR
Henry Hill
BY
Gould & Gould
ATTORNEYS

UNITED STATES PATENT OFFICE.

HENRY HILL, OF PORTLAND, OREGON, ASSIGNOR OF ONE-HALF TO JOHN HILL.

DUST-COLLECTOR.

959,936.

Specification of Letters Patent.

Patented May 31, 1910.

Application filed May 25, 1909. Serial No. 498,266.

*To all whom it may concern:*

Be it known that I, HENRY HILL, a citizen of the United States, residing at Portland, in the county of Multnomah and State of Oregon, have invented certain new and useful Improvements in Dust-Collectors, of which the following is a specification.

The invention relates broadly to dust collectors and specifically to one adapted to be employed in conjunction with a carpet cleaning and dust removing apparatus and using an air exhaust for drawing dust laden air therefrom into a dust receptacle and forcing said air against a dust arresting surface disposed within said receptacle.

The characteristic features of the invention are directed to an air-tight dust receptacle inclosing a removable dust arrester disposed in convoluted form and to the specific means for supporting and maintaining the same in operative position in said receptacle.

One object of the invention is the provision of a dust collector such as above indicated which shall include as an essential feature a fabric dust arrester of simple construction which, when disposed within the dust receptacle, will present a large dust arresting surface within a small area, the nature and arrangement of said arrester insuring unimpeded passage of an enforced air current therethrough while effectually arresting the dust in said current and depositing it in the bottom of the receptacle.

Another object is to provide means for detachably supporting and maintaining the dust arresting medium in desired extended relation within the dust receptacle which, while permitting the ready detachment of said arrester therefrom for purposes of substitution, will, from its construction and arrangement, present practically no obstruction to the free passage of an air current through the receptacle.

Another object is to provide a collector in which the dust arrester supporting means and attached arrester are adapted for convenient insertion into and withdrawal from the dust receptacle and the latter adapted for operative connection with any carpet cleaning machine or the like of ordinary type.

With the above as the primary objects, the invention will now be described in the following specification, taken in connection with the accompanying drawings, and then pointed out more particularly in the claims.

Figure 1:
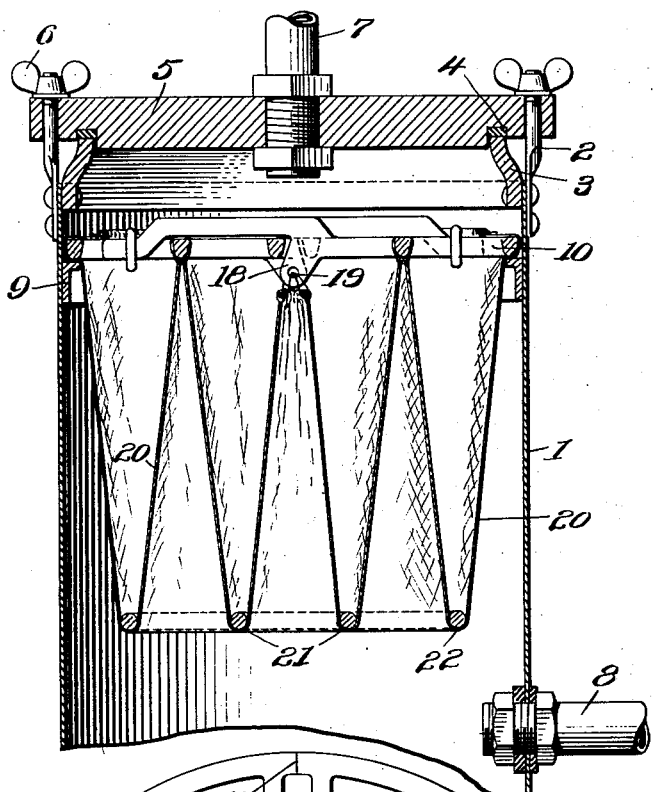
Figure 2:
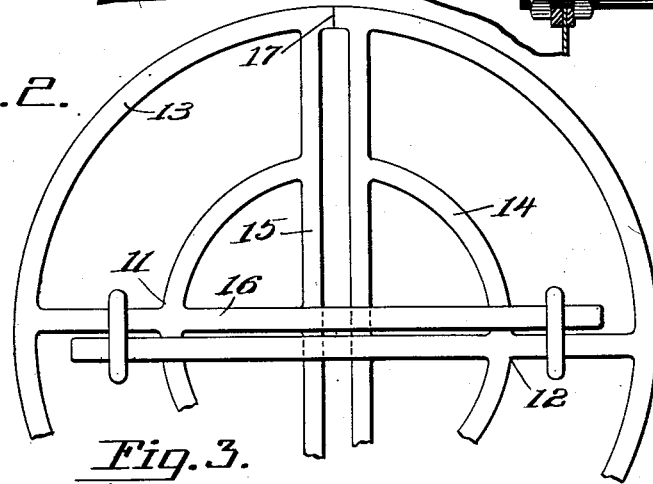
Figure 3:
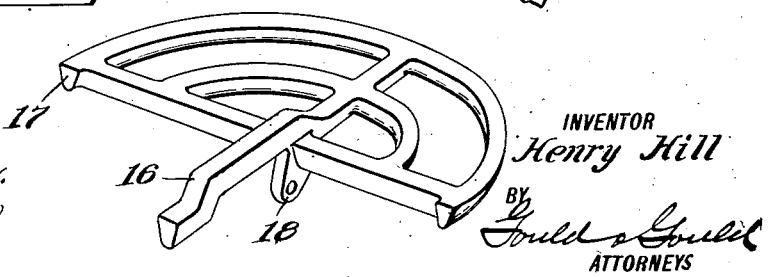

In the drawings, Figure 1 is a broken, central vertical section, partly in elevation of my improved dust collector. Fig. 2 is a broken top plan of the dust arrester supporting frame, and Fig. 3 is a perspective of one of the duplicate sections of which the dust arrester supporting frame is composed.

Referring now to the drawings, wherein the preferred embodiment of the details of my invention are shown, and wherein like reference numerals refer to like parts throughout the several views, 1 denotes a dust receptacle, formed of any desired material but preferably of metal and of cylindrical outline and provided exteriorly at appropriate points with rigid upwardly-extending positioning lugs 2 and interiorly in proximate relation thereto with a fixed circular closure ring 3 provided with packing 4, said positioning lugs being adapted to enter suitable apertures in a removable cover 5 and the closure ring seating in a circular groove formed in the lower surface of the cover, adjusting nuts 6, adapted for screw-threaded engagement with lugs 2, in conjunction with closure ring 3 providing for air-tight engagement of cover 5 with the dust receptacle.

Entering through a suitable aperture in the cover 5 and detachably connected thereto by any well known means in air tight manner, is the terminal of an air exhaust pipe 7 operatively connected to any means for withdrawing air from the interior of the dust receptacle, as an air pump or the like.

8 denotes a dust-inlet pipe, also adapted for air tight connection with the dust receptacle, the body portion of said pipe being preferably of flexible type and adapted for ready attachment with any dust-removing machine, as for instance a carpet-cleaning apparatus or the like.

Disposed near the upper end of the dust receptacle in approximately horizontal relation thereto and seating on and supported by a circumferential ledge 9 is a dust arrester supporting frame 10, formed of a pair of separable duplicate sections 11 and 12, each section being provided with arcuate members 13 and 14 and cross bars 15 and 16, bars 15 extending their entire length in a plane coincident with that of said arcuate members, the terminate faces 17 of said bars lying normally in contacting relation when the frame is operatively assembled in the dust receptacle, the arcuate dimension of members 13 being such as to position them in slightly spaced relation from the walls of the dust receptacle when so assembled.

Bars 16 extend from their connection with members 13 in the same horizontal plane as said members to the point of contact with bars 15, at which point they are provided with downwardly-extending hinge lugs 18 provided with pivot-pin 19 and projected in arch form over members 15 to a point beyond members 14 of the coöperating section of supporting frame and then in horizontal alinement with duplicate bar 16 of said section and in close proximity thereto, a locking ring 16' movably disposed on the latter being adapted to pass over the free end of bar 16 and hold the duplicate sections of the frame in locked engagement, the construction permitting, when locking rings 16' are out of operative engagement with bars 16, free hinge play of the duplicate sections and convenient access to members 13 and 14 to which the dust arrester is attached.

20 denotes the dust arrester, composed of material permeable in regard to a current of air but sufficiently close woven to intercept the dust particles in said current. It is of cylindrical, sack-like form open at both ends and provided with a draw cord at either end, and of any length desired to accord with the receptacle in connection with which it is to be employed.

In operatively attaching the arrester to the supporting frame, one end of the former is drawn closed by its respective draw cord and suspended by any desired means, as by tying or the like, to the lugs 18 of said frame, and the arrester allowed to extend downwardly an appropriate distance. A weighted spreader ring 21 is then slipped over the open end of the arrester and the latter folded upon itself and extended upwardly and circumferentially secured, as by tying, to members 14 throughout their entire length, again allowed to extend downwardly a distance preferably equal to that of the first fold and spreader ring 22, of larger diameter than ring 21, slipped over the open end of the arrester which is again folded upon itself and extended upwardly and passed outside of and over members 13 and drawn together by the remaining draw cord, the length of the arrester insuring that this upper free edge will overlie the members 13 an appreciable distance, as shown in Fig. 1, the relative size of the spreader rings being such as to dispose the folds at equal distance from each other laterally of the dust receptacle. The arrester and supporting frame are now inserted in the dust receptacle in operative position on ledge 9, the cover 5 adjusted in proper relation and the air exhausting means operated, when, as obvious, the dust, drawn from the cleaning machine through pipe 8 will be forced upward against the several converging walls of the dust arrester 20 from which, on the cessation of the passage of the air current, it will fall to the bottom of the receptacle from which it can be removed in any convenient manner, as through a removable, air tight trap or the like.

Having thus described my invention what I claim as new and desire to secure by Letters Patent, is:—

1. A dust arrester for cleaning apparatus comprising a supporting member, a bag-like body secured to and supported solely by the member at different points in the length of the body, and means engaging the body between the points of connection to the member to arrange the body in a series of concentric layers freely pendent from the member and being supported solely by the body.

2. A dust receptacle, a folding supporting member removably secured in the receptacle adjacent the upper end thereof, a bag-like body secured at spaced points to and supported solely by said member, and a plurality of single spreader rings disposed in freely-hanging relation to the receptacle for holding the sections of said body which are free of connection with the member in a position pendent from the member to dispose the entire inner surface of the body in the path of the dust current.

3. A dust receptacle, a supporting member arranged adjacent the upper end thereof, said member comprising separable duplicate sections, a bag-like fabric secured to and supported solely by the member, and means to hold said fabric freely pendent from the member to provide a series of angularly related concentric walls, said parts being arranged within the receptacle to permit their removal therefrom as an entirety.

4. A dust collector including a dust receptacle, a foldable supporting member removably arranged within the receptacle and comprising hingedly-connected sections, and means for locking the sections in rigid extended relation, a bag-like body secured at one end and at intermediate points to and supported solely by the member, and loosely-disposed independent rings respectively engaging those portions of the body intermediate the points of connection of the body and member.

In testimony whereof, I hereto affix my signature in presence of two witnesses.

HENRY HILL.

Witnesses:
 HARLEY A. REYNOLDS,
 LEWIS C. GARRIGUS.